United States Patent
Kennedy, III

(10) Patent No.: US 8,920,264 B2
(45) Date of Patent: Dec. 30, 2014

(54) GOLF BALL AND METHOD OF MANUFACTURING A GOLF BALL

(75) Inventor: Thomas J. Kennedy, III, Wilbraham, MA (US)

(73) Assignee: Nike, Inc., Beaverton, OR (US)

( * ) Notice: Subject to any disclaimer, the term of this patent is extended or adjusted under 35 U.S.C. 154(b) by 665 days.

(21) Appl. No.: 13/187,261

(22) Filed: Jul. 20, 2011

(65) Prior Publication Data

US 2012/0021850 A1    Jan. 26, 2012

Related U.S. Application Data

(60) Provisional application No. 61/366,183, filed on Jul. 21, 2010, provisional application No. 61/370,096, filed on Aug. 2, 2010.

(51) Int. Cl.
| | |
|---|---|
| *A63B 37/04* | (2006.01) |
| *A63B 37/00* | (2006.01) |
| *C08G 18/02* | (2006.01) |
| *C08G 18/18* | (2006.01) |

(52) U.S. Cl.
CPC ......... *A63B 37/0022* (2013.01); *A63B 37/0031* (2013.01); *A63B 37/0033* (2013.01); *A63B 37/0043* (2013.01); *A63B 37/0075* (2013.01); *A63B 37/0092* (2013.01); *C08G 18/022* (2013.01); *C08G 18/1875* (2013.01)
USPC .......................................... 473/378; 264/232

(58) Field of Classification Search
None
See application file for complete search history.

(56) References Cited

U.S. PATENT DOCUMENTS

| | | | |
|---|---|---|---|
| 3,793,236 | A | 2/1974 | Ashida et al. |
| 3,849,349 | A | 11/1974 | Frisch et al. |
| 4,128,537 | A | 12/1978 | Markiewitz |

(Continued)

FOREIGN PATENT DOCUMENTS

| | | |
|---|---|---|
| JP | 3494441 | 2/2004 |
| JP | 2005-533614 | 11/2005 |

(Continued)

OTHER PUBLICATIONS

International Search Report in corresponding PCT Application No. PCT/US2011/044604; mailed Sep. 6, 2011.

(Continued)

*Primary Examiner* — Gene Kim
*Assistant Examiner* — John E Simms, Jr.
(74) *Attorney, Agent, or Firm* — Banner & Witcoff, Ltd.

(57) ABSTRACT

A golf ball and a method of manufacturing a golf ball is disclosed. In one embodiment, a method of manufacturing a golf ball includes molding a cover made of thermoplastic resin over at least one intermediate layer of a golf ball; permeating an isocyanate solution comprising an isocyanate compound and a co-reactant compound into an outer portion of the cover; and permeating a catalyst into the outer portion of the cover. The catalyst catalyzes a reaction between the isocyanate compound and the co-reactant compound to form a reaction product. The co-reactant compound can be a second isocyanate compound, the catalyst can be a quaternary ammonium salt, and the reaction product can be isocyanurate. The reaction product modifies at least one physical property of the outer portion such that the physical property of the outer portion is different than the physical property of the inner portion. The modified physical property can be microindentation hardness, where the microindentation hardness of the outer portion is greater than the microindentation hardness of an inner portion of the cover.

13 Claims, 2 Drawing Sheets

(56) References Cited

U.S. PATENT DOCUMENTS

| | | | |
|---|---|---|---|
| 5,208,270 A | 5/1993 | Dai | |
| 5,409,233 A | 4/1995 | Kennedy | |
| 5,459,220 A | 10/1995 | Kennedy | |
| 5,683,312 A | 11/1997 | Boehm et al. | |
| 5,908,358 A | 6/1999 | Wu | |
| 5,919,100 A | 7/1999 | Boehm et al. | |
| 5,919,862 A | 7/1999 | Rajagopalan | |
| 5,922,252 A | 7/1999 | Stanton et al. | |
| 5,929,189 A | 7/1999 | Ichikawa et al. | |
| 5,957,784 A | 9/1999 | Asakura et al. | |
| 5,976,035 A | 11/1999 | Umezawa et al. | |
| 5,993,968 A | 11/1999 | Umezawa et al. | |
| 6,054,550 A | 4/2000 | Umezawa et al. | |
| 6,123,628 A | 9/2000 | Ichikawa et al. | |
| 6,142,888 A | 11/2000 | Higuchi et al. | |
| 6,150,462 A | 11/2000 | Rajagopalan et al. | |
| 6,174,245 B1 | 1/2001 | Stanton et al. | |
| 6,274,669 B1 | 8/2001 | Rajagopalan | |
| 6,290,614 B1 | 9/2001 | Kennedy, III et al. | |
| 6,319,152 B1 | 11/2001 | Takesue et al. | |
| 6,340,503 B1 | 1/2002 | Simonds et al. | |
| 6,355,715 B1 | 3/2002 | Ladd et al. | |
| 6,395,861 B1 | 5/2002 | Kennedy, III | |
| 6,458,307 B2 * | 10/2002 | Inoue et al. | 264/232 |
| 6,475,417 B2 * | 11/2002 | Nesbitt et al. | 264/134 |
| 6,476,130 B1 | 11/2002 | Rajagopalan et al. | |
| 6,486,250 B1 | 11/2002 | Rajagopalan | |
| 6,486,261 B1 | 11/2002 | Wu et al. | |
| 6,528,578 B2 | 3/2003 | Wu | |
| 6,551,395 B2 | 4/2003 | Isogawa | |
| 6,561,924 B2 | 5/2003 | Ogg | |
| 6,569,037 B2 | 5/2003 | Ichikawa et al. | |
| 6,592,470 B2 | 7/2003 | Watanabe et al. | |
| 6,593,443 B2 | 7/2003 | Iwami | |
| 6,610,812 B1 | 8/2003 | Wu et al. | |
| 6,620,059 B2 | 9/2003 | Sasaki et al. | |
| 6,632,147 B2 | 10/2003 | Cavallaro et al. | |
| 6,635,716 B2 | 10/2003 | Voorheis et al. | |
| 6,639,024 B2 | 10/2003 | Simonds et al. | |
| 6,645,091 B2 | 11/2003 | Wu et al. | |
| 6,652,392 B2 | 11/2003 | Higuchi et al. | |
| 6,656,061 B2 | 12/2003 | Iwami et al. | |
| 6,663,507 B1 | 12/2003 | Watanabe et al. | |
| 6,673,859 B2 | 1/2004 | Ladd et al. | |
| 6,676,542 B2 | 1/2004 | Kato et al. | |
| 6,689,860 B2 | 2/2004 | Iwami | |
| 6,702,694 B1 | 3/2004 | Watanabe | |
| 6,702,695 B1 | 3/2004 | Higuchi et al. | |
| 6,716,954 B2 | 4/2004 | Keller et al. | |
| 6,723,008 B2 | 4/2004 | Higuchi et al. | |
| 6,729,975 B2 | 5/2004 | Inoue et al. | |
| 6,736,737 B2 | 5/2004 | Higuchi et al. | |
| 6,739,986 B2 | 5/2004 | Higuchi et al. | |
| 6,743,121 B2 | 6/2004 | Sasaki | |
| 6,746,345 B2 | 6/2004 | Higuchi et al. | |
| 6,746,347 B2 | 6/2004 | Higuchi et al. | |
| 6,747,100 B2 | 6/2004 | Ichikawa et al. | |
| 6,750,299 B2 | 6/2004 | Ichikawa et al. | |
| 6,764,415 B2 | 7/2004 | Ichikawa et al. | |
| 6,783,469 B2 | 8/2004 | Iwami | |
| 6,783,808 B2 | 8/2004 | Lutz et al. | |
| 6,802,786 B2 | 10/2004 | Iwami et al. | |
| 6,806,323 B2 | 10/2004 | Ichikawa et al. | |
| 6,814,675 B2 | 11/2004 | Sasaki et al. | |
| 6,814,676 B2 | 11/2004 | Watanabe et al. | |
| 6,824,476 B2 | 11/2004 | Sullivan et al. | |
| 6,827,657 B2 | 12/2004 | Sullivan | |
| 6,840,873 B2 | 1/2005 | Iwami | |
| 6,846,250 B2 | 1/2005 | Higuchi et al. | |
| 6,855,074 B2 | 2/2005 | Kato | |
| 6,855,076 B2 | 2/2005 | Matroni et al. | |
| 6,861,492 B2 | 3/2005 | Wu et al. | |
| 6,887,167 B2 | 5/2005 | Kato et al. | |
| 6,887,168 B2 | 5/2005 | Hayashi et al. | |
| 6,894,098 B2 | 5/2005 | Rajagopalan et al. | |
| 6,899,641 B2 | 5/2005 | Watanabe | |
| 6,903,178 B2 | 6/2005 | Wu et al. | |
| 6,905,648 B2 | 6/2005 | Sullivan et al. | |
| 6,910,974 B2 | 6/2005 | Watanabe | |
| 6,924,337 B2 | 8/2005 | Kim et al. | |
| 6,935,970 B2 | 8/2005 | Matroni et al. | |
| 6,939,251 B2 | 9/2005 | Ichikawa et al. | |
| 6,939,907 B2 | 9/2005 | Rajagopalan et al. | |
| 6,939,924 B2 | 9/2005 | Kim et al. | |
| 6,949,604 B2 | 9/2005 | Risen, Jr. et al. | |
| 6,949,610 B2 | 9/2005 | Iwami | |
| 6,949,617 B2 | 9/2005 | Rajagopalan et al. | |
| 6,955,614 B2 | 10/2005 | Iwami | |
| 6,958,379 B2 | 10/2005 | Wu et al. | |
| 6,966,849 B2 | 11/2005 | Kato | |
| 6,966,850 B2 | 11/2005 | Watanabe et al. | |
| 6,982,056 B2 | 1/2006 | Sullivan | |
| 6,989,431 B2 | 1/2006 | Rajagopalan et al. | |
| 6,992,145 B2 | 1/2006 | Ichikawa et al. | |
| 7,026,430 B2 | 4/2006 | Keller et al. | |
| 7,037,963 B2 | 5/2006 | Takesue et al. | |
| 7,037,985 B2 | 5/2006 | Kim et al. | |
| 7,041,007 B2 | 5/2006 | Boehm et al. | |
| 7,059,975 B2 | 6/2006 | Sasaki et al. | |
| 7,066,837 B2 | 6/2006 | Jordan | |
| 7,066,839 B2 | 6/2006 | Sullivan | |
| 7,090,592 B2 | 8/2006 | Watanabe et al. | |
| 7,090,799 B2 | 8/2006 | Takesue et al. | |
| 7,098,274 B2 | 8/2006 | Wu et al. | |
| 7,101,951 B2 | 9/2006 | Wu et al. | |
| 7,131,915 B2 | 11/2006 | Sullivan et al. | |
| 7,138,475 B2 | 11/2006 | Kuntimaddi et al. | |
| 7,138,476 B2 | 11/2006 | Wu | |
| 7,140,979 B2 | 11/2006 | Umezawa et al. | |
| 7,153,576 B2 | 12/2006 | Wang et al. | |
| 7,153,926 B2 | 12/2006 | Isogawa et al. | |
| 7,157,545 B2 | 1/2007 | Wu et al. | |
| 7,160,208 B2 | 1/2007 | Watanabe | |
| 7,160,210 B2 | 1/2007 | Melanson et al. | |
| 7,160,940 B2 | 1/2007 | Hayashi et al. | |
| 7,169,861 B2 | 1/2007 | Kim et al. | |
| 7,182,701 B2 | 2/2007 | Keller et al. | |
| 7,198,576 B2 | 4/2007 | Sullivan et al. | |
| 7,208,562 B2 | 4/2007 | Kennedy, III et al. | |
| 7,217,200 B2 | 5/2007 | Matroni et al. | |
| 7,238,123 B2 | 7/2007 | Watanabe | |
| 7,244,196 B2 | 7/2007 | Kennedy, III et al. | |
| 7,264,560 B2 | 9/2007 | Bergin et al. | |
| 7,265,195 B2 | 9/2007 | Kuntimaddi et al. | |
| 7,271,222 B2 | 9/2007 | Wu et al. | |
| 7,276,570 B2 | 10/2007 | Kuntimaddi et al. | |
| 7,278,929 B2 | 10/2007 | Umezawa et al. | |
| 7,281,995 B2 | 10/2007 | Iwami et al. | |
| 7,281,996 B2 | 10/2007 | Melanson et al. | |
| 7,288,604 B2 | 10/2007 | Kuntimaddi et al. | |
| 7,306,528 B2 | 12/2007 | Jordan | |
| 7,329,194 B2 | 2/2008 | Watanabe et al. | |
| 7,344,454 B2 | 3/2008 | Umezawa et al. | |
| 7,387,581 B2 | 6/2008 | Higuchi et al. | |
| 7,390,852 B2 | 6/2008 | Hayashi et al. | |
| 7,417,094 B2 | 8/2008 | Dewanjee et al. | |
| 7,429,629 B2 | 9/2008 | Wu et al. | |
| 7,445,567 B2 | 11/2008 | Watanabe | |
| 7,458,904 B2 | 12/2008 | Sullivan et al. | |
| 7,458,905 B2 | 12/2008 | Comeau et al. | |
| 7,465,241 B2 | 12/2008 | Comeau et al. | |
| 7,479,533 B2 | 1/2009 | Nagasawa et al. | |
| 7,481,721 B2 | 1/2009 | Watanabe et al. | |
| 7,482,422 B2 | 1/2009 | Wu et al. | |
| 7,485,052 B2 | 2/2009 | Matroni et al. | |
| 7,491,787 B2 | 2/2009 | Wu et al. | |
| 7,497,790 B2 | 3/2009 | Sasaki et al. | |
| 7,517,943 B2 | 4/2009 | Kuntimaddi et al. | |
| 7,524,251 B2 | 4/2009 | Melanson et al. | |
| 7,540,990 B1 | 6/2009 | Dewanjee et al. | |
| 7,591,740 B2 | 9/2009 | Kennedy, III et al. | |
| 7,591,968 B2 | 9/2009 | Melanson et al. | |
| 7,604,552 B2 | 10/2009 | Melanson et al. | |
| 7,625,300 B2 | 12/2009 | Melanson et al. | |

(56) References Cited

U.S. PATENT DOCUMENTS

| Patent/Publication No. | Date | Inventor(s) |
|---|---|---|
| 7,625,302 B2 | 12/2009 | Watanabe et al. |
| 7,628,714 B2 | 12/2009 | Tarao |
| 7,637,825 B2 | 12/2009 | Matroni et al. |
| 7,637,826 B2 | 12/2009 | Kimura et al. |
| 7,641,841 B2 | 1/2010 | Melanson |
| 7,682,266 B2 | 3/2010 | Endo et al. |
| 7,695,379 B2 | 4/2010 | Higuchi et al. |
| 7,705,102 B2 | 4/2010 | Ricci et al. |
| 7,988,901 B2 * | 8/2011 | Melanson ............... 264/305 |
| 2001/0046907 A1 | 11/2001 | Bartels et al. |
| 2001/0050447 A1 | 12/2001 | Inoue et al. |
| 2002/0006837 A1 | 1/2002 | Dalton et al. |
| 2002/0025862 A1 | 2/2002 | Sullivan et al. |
| 2002/0028885 A1 | 3/2002 | Sullivan et al. |
| 2002/0035211 A1 | 3/2002 | Wu |
| 2002/0039936 A1 | 4/2002 | Binette et al. |
| 2002/0045696 A1 | 4/2002 | Sullivan et al. |
| 2002/0052251 A1 | 5/2002 | Iwami |
| 2002/0052254 A1 | 5/2002 | Ichikawa et al. |
| 2002/0055400 A1 | 5/2002 | Higuchi et al. |
| 2002/0058553 A1 | 5/2002 | Higuchi et al. |
| 2002/0061792 A1 | 5/2002 | Yagley et al. |
| 2002/0061793 A1 | 5/2002 | Higuchi et al. |
| 2002/0086931 A1 | 7/2002 | Ladd et al. |
| 2002/0091018 A1 | 7/2002 | Sasaki et al. |
| 2002/0098290 A1 * | 7/2002 | Simonds et al. ........... 427/385.5 |
| 2002/0098915 A1 | 7/2002 | Cavallaro et al. |
| 2002/0098917 A1 | 7/2002 | Iwami |
| 2002/0098918 A1 | 7/2002 | Wu et al. |
| 2002/0119832 A1 | 8/2002 | Higuchi et al. |
| 2002/0119833 A1 | 8/2002 | Dewanjee |
| 2002/0119840 A1 | 8/2002 | Higuchi et al. |
| 2002/0167116 A1 | 11/2002 | Inoue et al. |
| 2003/0004013 A1 | 1/2003 | Lutz et al. |
| 2003/0027665 A1 | 2/2003 | Yagley et al. |
| 2003/0027666 A1 | 2/2003 | Watanabe et al. |
| 2003/0027667 A1 | 2/2003 | Sullivan |
| 2003/0027669 A1 | 2/2003 | Sullivan |
| 2003/0045375 A1 | 3/2003 | Sasaki et al. |
| 2003/0050425 A1 | 3/2003 | Kennedy, III et al. |
| 2003/0064826 A1 | 4/2003 | Voorheis et al. |
| 2003/0064831 A1 | 4/2003 | Ichikawa et al. |
| 2003/0064832 A1 | 4/2003 | Ichikawa et al. |
| 2003/0064833 A1 | 4/2003 | Ichikawa et al. |
| 2003/0064834 A1 | 4/2003 | Ichikawa et al. |
| 2003/0064835 A1 | 4/2003 | Ichikawa et al. |
| 2003/0069085 A1 | 4/2003 | Hogge et al. |
| 2003/0073514 A1 | 4/2003 | Iwami et al. |
| 2003/0073516 A1 | 4/2003 | Watanabe et al. |
| 2003/0092510 A1 | 5/2003 | Iwami et al. |
| 2003/0096664 A1 | 5/2003 | Jordan |
| 2003/0100385 A1 | 5/2003 | Fushihara et al. |
| 2003/0100386 A1 | 5/2003 | Jordan |
| 2003/0100387 A1 | 5/2003 | Kato et al. |
| 2003/0109649 A1 | 6/2003 | Keller et al. |
| 2003/0114247 A1 | 6/2003 | Cavallaro et al. |
| 2003/0114602 A1 | 6/2003 | Wu et al. |
| 2003/0119604 A1 | 6/2003 | Moriyama et al. |
| 2003/0125135 A1 | 7/2003 | Iwami et al. |
| 2003/0130064 A1 | 7/2003 | Sasaki et al. |
| 2003/0130065 A1 | 7/2003 | Watanabe |
| 2003/0130066 A1 | 7/2003 | Sasaki |
| 2003/0130473 A1 | 7/2003 | Iwami |
| 2003/0134694 A1 | 7/2003 | Watanabe et al. |
| 2003/0134955 A1 | 7/2003 | Cavallaro et al. |
| 2003/0139230 A1 | 7/2003 | Iwami |
| 2003/0144085 A1 | 7/2003 | Sasaki et al. |
| 2003/0144087 A1 | 7/2003 | Rajagopalan et al. |
| 2003/0153716 A1 | 8/2003 | Wu et al. |
| 2003/0158352 A1 | 8/2003 | Rajagopalan et al. |
| 2003/0166422 A1 | 9/2003 | Kato et al. |
| 2003/0171165 A1 | 9/2003 | Watanabe |
| 2003/0176619 A1 | 9/2003 | Keller et al. |
| 2003/0199643 A1 | 10/2003 | Iwami |
| 2003/0199662 A1 | 10/2003 | Risen et al. |
| 2003/0203770 A1 | 10/2003 | Dewanjee |
| 2003/0211904 A1 | 11/2003 | Iwami et al. |
| 2003/0220464 A1 | 11/2003 | Wu et al. |
| 2003/0225222 A1 | 12/2003 | Sullivan et al. |
| 2003/0232664 A1 | 12/2003 | Sasaki |
| 2003/0232665 A1 | 12/2003 | Sasaki et al. |
| 2004/0014535 A1 | 1/2004 | Wu et al. |
| 2004/0014906 A1 | 1/2004 | Keller et al. |
| 2004/0018893 A1 | 1/2004 | Iwami |
| 2004/0019138 A1 | 1/2004 | Voorheis et al. |
| 2004/0038753 A1 | 2/2004 | Kato |
| 2004/0048687 A1 | 3/2004 | Jordan |
| 2004/0058750 A1 | 3/2004 | Iwami |
| 2004/0072629 A1 | 4/2004 | Keller et al. |
| 2004/0077434 A1 * | 4/2004 | Matroni et al. ............... 473/351 |
| 2004/0077435 A1 | 4/2004 | Matroni et al. |
| 2004/0080080 A1 | 4/2004 | Dalton et al. |
| 2004/0092335 A1 | 5/2004 | Boehm et al. |
| 2004/0092667 A1 | 5/2004 | Wu et al. |
| 2004/0097653 A1 | 5/2004 | Kim et al. |
| 2004/0106473 A1 | 6/2004 | Hayashi et al. |
| 2004/0106474 A1 | 6/2004 | Hayashi et al. |
| 2004/0106736 A1 | 6/2004 | Takesue et al. |
| 2004/0138010 A1 | 7/2004 | Ichikawa et al. |
| 2004/0142770 A1 | 7/2004 | Watanabe |
| 2004/0176190 A1 | 9/2004 | Higuchi et al. |
| 2004/0180735 A1 | 9/2004 | Sullivan |
| 2004/0181014 A1 | 9/2004 | Kim et al. |
| 2004/0186246 A1 | 9/2004 | Keller et al. |
| 2004/0198940 A1 | 10/2004 | Wu et al. |
| 2004/0214964 A1 | 10/2004 | Kim et al. |
| 2004/0220357 A1 | 11/2004 | Wu et al. |
| 2004/0220371 A1 | 11/2004 | Wu |
| 2004/0220373 A1 | 11/2004 | Wu et al. |
| 2004/0220375 A1 | 11/2004 | Wu |
| 2004/0220376 A1 | 11/2004 | Kuntimaddi et al. |
| 2004/0220378 A1 | 11/2004 | Kuntimaddi et al. |
| 2004/0225100 A1 | 11/2004 | Rajagopalan et al. |
| 2004/0225102 A1 | 11/2004 | Rajagopalan et al. |
| 2004/0254032 A1 | 12/2004 | Lutz et al. |
| 2004/0259665 A1 | 12/2004 | Sullivan et al. |
| 2004/0266558 A1 * | 12/2004 | Kuntimaddi et al. ......... 473/373 |
| 2004/0266971 A1 | 12/2004 | Wu |
| 2005/0004325 A1 | 1/2005 | Wu et al. |
| 2005/0009636 A1 | 1/2005 | Kuntimaddi et al. |
| 2005/0009637 A1 | 1/2005 | Wu et al. |
| 2005/0009638 A1 | 1/2005 | Wu et al. |
| 2005/0038190 A1 | 2/2005 | Kuntimaddi |
| 2005/0070377 A1 | 3/2005 | Cavallaro et al. |
| 2005/0075196 A1 | 4/2005 | Shimizu et al. |
| 2005/0079351 A1 | 4/2005 | Isogawa et al. |
| 2005/0079929 A1 | 4/2005 | Tzivanis et al. |
| 2005/0085590 A1 | 4/2005 | Morgan et al. |
| 2005/0107188 A1 | 5/2005 | Kennedy, III et al. |
| 2005/0133960 A1 | 6/2005 | Keller et al. |
| 2005/0146077 A1 | 7/2005 | Tzivanis et al. |
| 2005/0153793 A1 | 7/2005 | Matroni et al. |
| 2005/0158554 A1 | 7/2005 | Wang et al. |
| 2005/0181891 A1 | 8/2005 | Umezawa et al. |
| 2005/0192121 A1 | 9/2005 | Watanabe |
| 2005/0202904 A1 | 9/2005 | Takesue et al. |
| 2005/0250599 A1 | 11/2005 | Watanabe et al. |
| 2005/0255942 A1 | 11/2005 | Mayer, Jr. |
| 2005/0261447 A1 | 11/2005 | Koshiro et al. |
| 2005/0272529 A1 | 12/2005 | Wu |
| 2005/0272899 A1 | 12/2005 | Wu |
| 2005/0272900 A1 | 12/2005 | Kuntimaddi et al. |
| 2005/0272909 A1 | 12/2005 | Kuntimaddi et al. |
| 2005/0288125 A1 | 12/2005 | Takesue et al. |
| 2006/0004153 A1 | 1/2006 | Kuntimaddi |
| 2006/0009310 A1 | 1/2006 | Melanson et al. |
| 2006/0014923 A1 | 1/2006 | Rajagopalan et al. |
| 2006/0025238 A1 | 2/2006 | Endo et al. |
| 2006/0036056 A1 | 2/2006 | Wu et al. |
| 2006/0038321 A1 | 2/2006 | Tzivanis et al. |
| 2006/0068938 A1 | 3/2006 | Sullivan |
| 2006/0083863 A1 | 4/2006 | Cavallaro et al. |
| 2006/0089419 A1 | 4/2006 | Hogge et al. |
| 2006/0091587 A1 | 5/2006 | Melanson et al. |

(56) References Cited

U.S. PATENT DOCUMENTS

| | | |
|---|---|---|
| 2006/0094538 A1 | 5/2006 | Kennedy, III et al. |
| 2006/0148590 A1 | 7/2006 | Sullivan et al. |
| 2006/0151917 A1 | 7/2006 | Kim et al. |
| 2006/0173139 A1 | 8/2006 | Ricci et al. |
| 2006/0178233 A1 | 8/2006 | Ricci |
| 2006/0189412 A1 | 8/2006 | Sullivan et al. |
| 2006/0205536 A1 | 9/2006 | Bergin et al. |
| 2006/0211515 A1 | 9/2006 | Melanson et al. |
| 2006/0247073 A1 | 11/2006 | Kennedy, III et al. |
| 2006/0249880 A1 | 11/2006 | Nagasawa et al. |
| 2006/0252578 A1 | 11/2006 | Nagasawa et al. |
| 2006/0252579 A1 | 11/2006 | Umezawa et al. |
| 2006/0270790 A1 | 11/2006 | Comeau |
| 2006/0276596 A1 | 12/2006 | Hayashi et al. |
| 2006/0281825 A1 | 12/2006 | Lee et al. |
| 2007/0001348 A1* | 1/2007 | Melanson et al. ............ 264/488 |
| 2007/0010351 A1 | 1/2007 | Umezawa et al. |
| 2007/0015605 A1 | 1/2007 | Kim et al. |
| 2007/0040297 A1 | 2/2007 | Melanson |
| 2007/0049420 A1 | 3/2007 | Melanson et al. |
| 2007/0072701 A1 | 3/2007 | Nagasawa |
| 2007/0082754 A1 | 4/2007 | Sullivan et al. |
| 2007/0083029 A1 | 4/2007 | Wu et al. |
| 2007/0087863 A1 | 4/2007 | Matroni et al. |
| 2007/0100075 A1 | 5/2007 | Takesue |
| 2007/0100085 A1 | 5/2007 | Kim et al. |
| 2007/0111824 A1 | 5/2007 | Melanson et al. |
| 2007/0129510 A1 | 6/2007 | Kuntimaddi et al. |
| 2007/0135235 A1 | 6/2007 | Kennedy, III |
| 2007/0142127 A1 | 6/2007 | Tarao |
| 2007/0197724 A1 | 8/2007 | Wu et al. |
| 2007/0219021 A1 | 9/2007 | Matroni et al. |
| 2007/0222120 A1 | 9/2007 | Melanson et al. |
| 2007/0232756 A1 | 10/2007 | Kim et al. |
| 2007/0270242 A1 | 11/2007 | Keller et al. |
| 2007/0281801 A1 | 12/2007 | Watanabe et al. |
| 2007/0281802 A1 | 12/2007 | Watanabe et al. |
| 2007/0287557 A1 | 12/2007 | Watanabe et al. |
| 2008/0020863 A1 | 1/2008 | Higuchi et al. |
| 2008/0051222 A1 | 2/2008 | Matroni et al. |
| 2008/0051223 A1 | 2/2008 | Nagasawa et al. |
| 2008/0064526 A1 | 3/2008 | Watanabe et al. |
| 2008/0064530 A1 | 3/2008 | Matroni et al. |
| 2008/0085784 A1 | 4/2008 | Watanabe et al. |
| 2008/0090678 A1 | 4/2008 | Kim et al. |
| 2008/0102987 A1 | 5/2008 | Watanabe et al. |
| 2008/0106000 A1 | 5/2008 | Tzivanis et al. |
| 2008/0125247 A1 | 5/2008 | Rajagopalan et al. |
| 2008/0132357 A1 | 6/2008 | Kennedy et al. |
| 2008/0146376 A1 | 6/2008 | Watanabe |
| 2008/0146377 A1 | 6/2008 | Watanabe |
| 2008/0161134 A1 | 7/2008 | Tarao |
| 2008/0194359 A1 | 8/2008 | Higuchi et al. |
| 2008/0200283 A1 | 8/2008 | Wu et al. |
| 2008/0214325 A1 | 9/2008 | Higuchi et al. |
| 2008/0217810 A1 | 9/2008 | Nagasawa et al. |
| 2008/0234068 A1 | 9/2008 | Comeau et al. |
| 2008/0234069 A1 | 9/2008 | Comeau et al. |
| 2008/0234070 A1 | 9/2008 | Comeau et al. |
| 2008/0261721 A1 | 10/2008 | Hogge et al. |
| 2008/0274827 A1 | 11/2008 | Matroni et al. |
| 2008/0300069 A1 | 12/2008 | Rajagopalan et al. |
| 2008/0305890 A1 | 12/2008 | Watanabe et al. |
| 2008/0312008 A1 | 12/2008 | Higuchi et al. |
| 2009/0011868 A1 | 1/2009 | Ricci et al. |
| 2009/0036234 A1 | 2/2009 | Nanba et al. |
| 2009/0069117 A1 | 3/2009 | Kennedy, III et al. |
| 2009/0075758 A1 | 3/2009 | Nakamura et al. |
| 2009/0075759 A1 | 3/2009 | Nakamura et al. |
| 2009/0092811 A1 | 4/2009 | Chasser et al. |
| 2009/0105013 A1 | 4/2009 | Slagel et al. |
| 2009/0111608 A1 | 4/2009 | Watanabe et al. |
| 2009/0111609 A1 | 4/2009 | Watanabe et al. |
| 2009/0111610 A1 | 4/2009 | Watanabe et al. |
| 2009/0111611 A1 | 4/2009 | Kimura et al. |
| 2009/0111612 A1 | 4/2009 | Nanba et al. |
| 2009/0111614 A1 | 4/2009 | Ohira |
| 2009/0124420 A1 | 5/2009 | Kamino et al. |
| 2009/0124421 A1 | 5/2009 | Hirau et al. |
| 2009/0124429 A1 | 5/2009 | Hirau et al. |
| 2009/0124430 A1 | 5/2009 | Hirau et al. |
| 2009/0137342 A1 | 5/2009 | Wu et al. |
| 2009/0149278 A1 | 6/2009 | Wu et al. |
| 2009/0163298 A1 | 6/2009 | Kim et al. |
| 2009/0170633 A1 | 7/2009 | Kim et al. |
| 2009/0170636 A1 | 7/2009 | Kamino et al. |
| 2009/0170637 A1 | 7/2009 | Ohama et al. |
| 2009/0203468 A1 | 8/2009 | Melanson et al. |
| 2009/0206518 A1 | 8/2009 | Kennedy, III |
| 2009/0221387 A1 | 9/2009 | Ohama et al. |
| 2009/0233733 A1 | 9/2009 | Watanabe et al. |
| 2009/0247326 A1 | 10/2009 | Ohama et al. |
| 2009/0247328 A1 | 10/2009 | Kamino et al. |
| 2009/0264221 A1 | 10/2009 | Tarao |
| 2009/0291777 A1 | 11/2009 | Rajagopalan et al. |
| 2010/0015351 A1 | 1/2010 | Melanson et al. |
| 2010/0035705 A1 | 2/2010 | Melanson et al. |
| 2010/0048326 A1 | 2/2010 | Kimura et al. |
| 2010/0056299 A1* | 3/2010 | Egashira et al. ............. 473/351 |
| 2010/0056304 A1* | 3/2010 | Egashira et al. ............. 473/378 |
| 2010/0084789 A1 | 4/2010 | Melanson et al. |

FOREIGN PATENT DOCUMENTS

| | | |
|---|---|---|
| JP | 2010-051796 | 3/2010 |
| WO | 02085464 | 10/2002 |
| WO | 2005056119 | 6/2005 |
| WO | 2007005383 | 1/2007 |
| WO | 2007022270 | 2/2007 |
| WO | 2007112220 | 10/2007 |

OTHER PUBLICATIONS

Office Action and English Translation for Japanese Application No. 2013-520828, dated May 21, 2014, 11 pages.

L.H. Sterling, "Interpenetrating Polymer Networks: An Overview," American Chemical Society, Published May 5, 1994, downloaded on Sep. 4, 2014 from http://pubs.acs.org, 36 pages.

John L. Stanford, Anthony J. Ryan and Ying Yang, "The Formation and Properties of Acrylic-Polyurea Interpenetrating Networks Formed by Reaction Injection Moulding (RIM)" Polymer Science and Technology Group, Manchester Materials Science Centre, University of Manchester and UMIST, Macromol. Symp. 171, 139-150 (2001), 12 pages.

* cited by examiner

GOLF BALL AND METHOD OF MANUFACTURING A GOLF BALL

CROSS-REFERENCE TO RELATED APPLICATIONS

This application claims the benefit of U.S. Provisional Application Nos. 61/366,183, filed Jul. 21, 2010 and 61/370,096, filed Aug. 2, 2010, which are incorporated by reference in their entireties as if fully set forth herein.

FIELD AND BACKGROUND OF THE INVENTION

This invention relates to golf balls and methods of manufacturing golf balls. The physical properties, composition, and design of a golf ball determine its performance characteristics during play, including distance, loft, flight symmetry, spin, and durability. Golf balls can be constructed so that certain performance characteristics are emphasized and/or deemphasized to execute various types of shots in view of the different golf clubs used to make such shots.

For example, golf balls can be constructed to emphasize or deemphasize the spin characteristic of the ball according to the distance of the desired shot and the club used to make such shot. For long distance shots, where drivers, woods, and long irons are used, high spin is generally not desirable. High spin can increase lift which can result in a loss of distance. In contrast, for mid to short distance shots, high spin (approximately 5,000 to 12,000 rpm) can be desirable. High spin can improve control during flight and stopping power ("grab") when the ball hits the green. The characteristic of a ball to have low spin for long distance shots and high spin for mid to short distance shots can be referred to as spin separation. Multilayer golf balls with soft covers (low flex modulus and low hardness) and hard intermediate layers provide good spin separation.

However, soft covers are susceptible to "scuffing" or shear yielding of the polymer that compromises the integrity and performance of the ball. The irons and wedges used to perform mid to short distance shots have a clubface with a large angle of loft when measured in reference to the ground with 0 degrees being with the face of the club perpendicular to the ground and 90 degrees being with the face of the club parallel to the ground. The large angled clubfaces impart relatively high shear force on the cover of the ball when the clubface strikes the ball. These shear forces are high enough to cause the polymer material of the cover to shear yield or "scuff." A high degree of scuffing renders the ball unfit for play. It can also cause the spin rate to decrease during the shot when the scuffing occurs, thus giving inconsistent spin characteristics to the golf ball. Accordingly, it is desirable to construct a golf ball cover that is soft for use in multilayer golf balls with good spin separation but less susceptible to shear yielding or scuffing.

One attempted solution is described in U.S. Pat. Nos. 6,458,307 and 6,729,975. These patents disclose hardening the surface of a golf ball cover made of thermoplastic resin by allowing a polyisocyanate compound to permeate into the surface of the cover and cause a reaction between the polyisocyanate compound and active hydrogen groups contained in the thermoplastic resin to form a number of urethane linkages and urea linkages to crosslink the thermoplastic resin. Nonetheless, scuffing continues to be problem.

SUMMARY OF THE INVENTION

In one embodiment, a multi-layer golf ball includes a core, at least one intermediate layer, and a cover. The cover can be made of a thermoplastic resin and includes an outer portion and an inner portion. The outer portion of the cover includes an interpenetrating polymer network of the thermoplastic resin and at least one of a carbodiimide, an isocyanate dimer, an isocyanate trimer, a polyisocyanurate, an uretonimine, and an oxazolidone. The inner portion is substantially devoid of the interpenetrating polymer network. The outer portion of the cover has a microindentation hardness that is greater than the microindentation hardness of the inner portion of the cover.

In one embodiment, a multi-layer golf ball includes a cover, at least one intermediate layer, and a cover. The cover can be made of a thermoplastic resin and include an outer portion and an inner portion. The outer portion can include the thermoplastic resin and a reaction product of an isocyanate compound and a co-reactant compound having a non-active hydrogen group, the isocyanate compound having reacted with the non-active hydrogen group of the co-reactant compound in the presence of a catalyst to form the reaction product.

In one embodiment, a method of manufacturing a golf ball includes molding a cover made of thermoplastic resin over at least one intermediate layer of a golf ball; permeating an isocyanate solution comprising an isocyanate compound, a co-reactant compound, and a catalyst into an outer portion of the cover. The catalyst catalyzes a reaction between the isocyanate compound and the co-reactant compound to form a reaction product. The co-reactant compound can be a second isocyanate compound, the catalyst can be a quaternary ammonium salt, and the reaction product can be isocyanurate. The reaction product modifies at least one physical property of the outer portion such that the physical property of the outer portion is different than the physical property of the inner portion. The modified physical property can be microindentation hardness, where the microindentation hardness of the outer portion is greater than the microindentation hardness of an inner portion of the cover.

DETAILED DESCRIPTION

Figure 1:
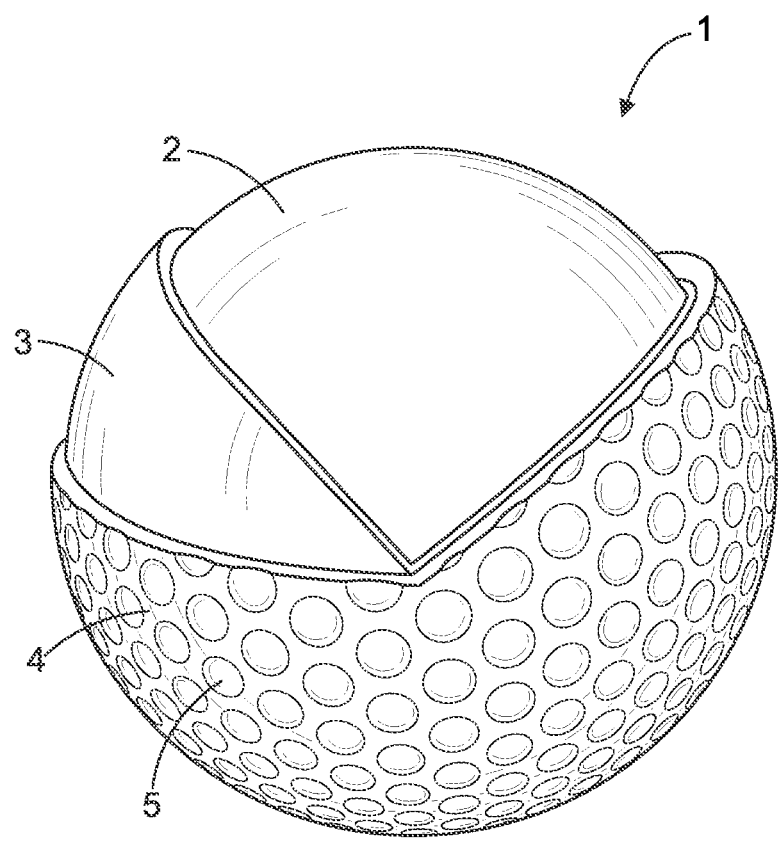
FIG. 1 depicts a sectional view of a multilayer golf ball.
Figure 2:
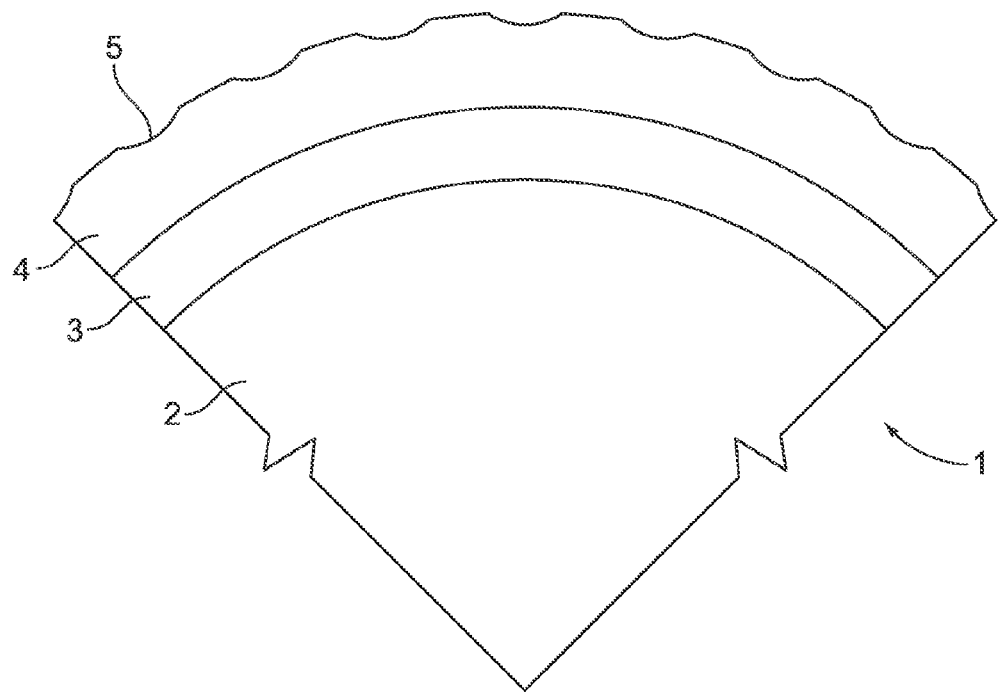
FIG. 2 depicts a portion of a cross-sectional view of a multilayer golf ball.
Figure 3:
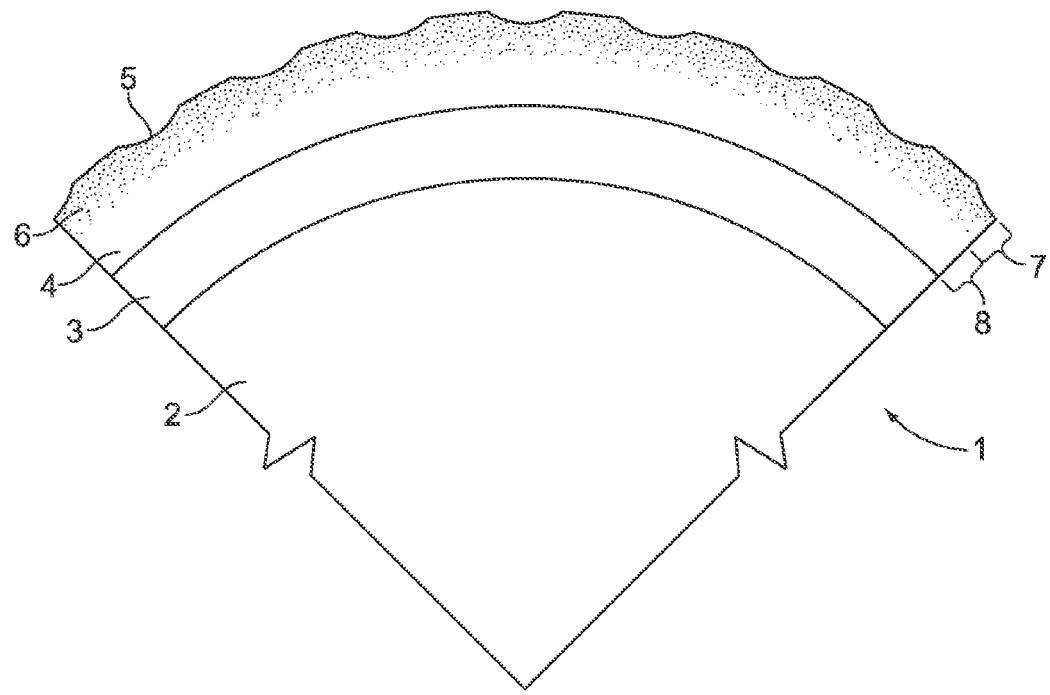
FIG. 3 depicts a portion of a cross-sectional view of an embodiment of a multilayer golf ball of the current invention.

An embodiment of the current invention can be useful, for example, to improve the performance of multilayer golf balls. As used herein, the term multi-layer golf ball means a golf ball constructed of at least two layers and can include, for example, two-piece, three-piece, and four-piece golf balls. Referring to FIGS. 1 through 3, an example of a three-piece multi-layer golf ball can include a core 2, an intermediate layer 3, and a cover 4. The cover 4 can include dimples 5 molded thereon. Multilayer golf balls and corresponding individual layers of the ball may be made by any suitable materials and methods known to those of ordinary skill in the art, including those described in, for example, U.S. Pat. No. 7,491,878.

In one embodiment of the current invention, a golf ball with cover formed of thermoplastic resin, such as thermoplastic polyurethane, is permeated with an isocyanate solution. The solution can include an isocyanate compound, a co-reactant compound, and a catalyst. The co-reactant can include at least one non-active hydrogen group. A non-active hydrogen group is a hydrogen group on a compound that is typically not labile or exchangeable during a reaction. The co-reactant compound can be, for example, at least one of a second isocyanate compound, a carbodiimide, and an epoxide.

Isocyanates are the derivatives of isocyanic acid (H—N═C═O). The functionality of the isocyanate (—N═C═O) group is highly reactive toward proton-bearing nucleophiles (such as primary hydroxyl and primary amine compounds), and the reaction of the isocyanate usually proceeds with addition to the carbon-nitrogen bond. The reactions of isocyanates fall into two main categories:
1. Active hydrogen reaction; and
2. Non-active hydrogen reaction.

An active hydrogen is one such as those attached to hydroxyl (—OH) groups, amine groups (—NH$_2$) and water (HOH) molecules. Polyurethane chemistry is based on the reactions of isocyanates with active hydrogen-containing compounds. Isocyanates are compounds having one or more of the highly reactive isocyanate group (—N═C═O). This group will readily react with hydrogen atoms that are attached to atoms more electronegative than carbon. The reactivity of the isocyanate group can be explained by considering the resonance possibilities presented in the figure below.

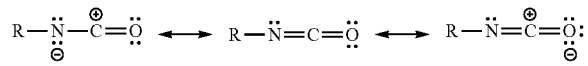

Electron density is expected to be greatest on the oxygen atom and least on the carbon atom. This results in the oxygen atom having the largest net negative charge, the carbon a net positive charge, and the nitrogen, an intermediate net negative charge.

Non-proton bearing nucleophiles (non-active hydrogens), such as other isocyanates, will react with the aid of a catalyst. For example, in the presence of a trimerization catalyst, the nitrogen atom of one isocyanate will react with the carbon atom of a second isocyanate and the nitrogen atom of a third isocyanate will then react with carbon atom of the first isocyanate. This forms the isocyanurate ring. There is no nucleophilic addition of hydrogen to the nitrogen atom of the isocyanate group. The isocyanurate molecule that is formed is very thermally stable.

In one embodiment, the isocyanate solution can be caused to permeate through the surface of the cover 4 and into the thermoplastic resin of the cover 4 to a depth that is less than the entire thickness of the cover 4. The portion between the surface of the cover 4 and the depth to which the solution is allowed to permeate can be referred to as the outer portion 7 of the cover 4. In one embodiment, the outer portion 7 has a thickness of about 0.1 mm to 1.0 mm. In another embodiment, the solution is allowed to permeate to a depth of about 15 to 20 mils. The permeation can cause the isocyanate compound, co-reactant, and catalyst to diffuse through the network of thermoplastic resin within the outer portion 7 of the cover 4. The portion of the cover in which the solution does not permeate can be referred to as the inner portion 8 of the cover 4. An example of the outer portion 7 and inner portion 8 of the cover 4 as those terms are used herein is depicted in FIG. 3.

The catalyst can catalyze a reaction between the isocyanate compound and the co-reactant compound to form a reaction product. In one embodiment, the catalyst can be at least one of a phosphine oxide, a pyridine, an alkali soap, a quaternary ammonium salt, a strong base, an organoantimony iodide, a zinc acetyl-acetonate, and a benzoyl chloride. The catalyst can catalyze the reaction between the isocyanate compound and the non-active hydrogen group of the co-reactant compound to form the reaction product. The reaction product can be, for example, at least one of a carbodiimide, an isocyanate dimer, an isocyanate trimer, a polyisocyanurate, an uretonimine, and an oxazolidone. Example typical reactions between the isocyanate compound and co-reactant compound in the presence of the catalyst to form the reaction product are included in Table 1.

TABLE 1

| Co-Reactant | Catalyst | Reaction Product |
|---|---|---|
| Isocyanate | Phosphine oxide | Carrbodiimides |
| Isocyanate | Pyridine | Isocyanate dimer |
| Isocyanate | Alkali soap; Quaternary ammonium salt | Isocyanate trimer (isocyanurate) |
| Isocyanate | Strong base | Polyisocyanurate |
| Carbodiimides | Carbodiimides | Uretonimines |
| Epoxides | Organoantimony iodides | Oxazolidones |

FIG. 3 depicts an example of the reaction product 6 in the outer portion 7 of the cover 4. In the example depicted in FIG. 3, a higher concentration of reaction product is shown near the surface of the cover 4 so as to form a gradient of reaction product in the outer portion 7. In one embodiment, the reaction product penetrates into the cover to a depth of about 15 to 20 mils, thereby forming an outer portion 7 of the cover having thickness of about 15 to 20 mils. The inner portion 7 of the cover can be substantially devoid of the reaction product. For purposes this application, substantially devoid means a di minimums amount or an amount insubstantial to impact the physical properties of the material or performance characteristics of the ball.

The reaction between the isocyanate compound and the co-reactant can occur within the network of thermoplastic resin in the outer portion 7 and form an interpenetrating polymer network of the reaction product and the thermoplastic resin in the outer portion 7 of the cover 4. An interpenetrating polymer network (IPN) as used herein means a polymer material comprising two or more networks which are at least partially interlaced on a polymer scale but not covalently bonded to each other and cannot be separated unless chemical bonds are broken. In addition, the inner portion 8 of the cover 4 can be substantially devoid of the IPN of thermoplastic resin and reaction product.

The reaction product and/or IPN of thermoplastic resin and reaction product can result in the modification of at least one physical property of the outer portion of the cover. For example, the reaction product and/or IPN can increase the hardness of the outer portion 7 of the cover 4 so that the hardness of the outer portion 7 is greater than the hardness of the inner portion 8. Hardness can be determined by, for example, microindentation hardness testing in accordance with the Vickers hardness test (HV) or Knoop hardness test (HK). Increased hardness of the outer portion 7 can, for example, improve the shear resistance and spin separation properties of the golf ball.

Example isocyanate compounds suitable for purposes of the invention include: toluene 2,4-diisocyanate (TDI)/2,4-diisocyanato-1-mehybenzene; toluene 2,6-diisocyanate (TDI)/2,6-diisocyanato-1-mehybenzene; 65:35 mixture of toluene 2,4 and 2,6-diisocyanate (TDI-65/35); 80:20 mixture of toluene 2,4 and 2,6-diisocyanate (TDI-80/20); 4,4'-diphenyl methane diisocyanate (MDI)/1,1'-methylenebis(4-isocyanato-benzene); 2,4'-diphenyl methane diisocyanate (MDI)/1-isocyanato-2-(4-isocyanatophenyl)methylbenzene; 2,2'-diphenyl methane diisocyanate (MDI)/1,1'-methylenebis(2- isocyanato-benzene); hexamethylene diisocyanate (HDI)/1, 6-diisocyanatohexane; isophorone diisocyanate (IPDI)/5-isocyabato-1-(isocyanatomethy)-1,3,3-trimethylcyclohexane; m-tetramethylxylene diisocyanate (m-TMXDI)/1,3-bis(1-isocyanato-1-methylethy) benzene; dicyclohexylmethane 4,4'-diisocyanate (HMDI)/1,1'-methylebis(4-isocyanato-cyclohexane); triphenylmethane-4,4', 4"-(triisocyanate/1,1',1"-methylidynetris (4-isocyanatobenzene); naphthalene 1,5-diisocyanate (NDI)/1,5-diisocyanatonaphthalene; p-phenylene diisocynate (PPDI)/1, 4-diidocyanatobenzene. An example of a useful diisocyanate is MONDUR MR LIGHT produced by Bayer Corporation.

Example catalysts suitable for the purposes of the invention follow. An example phosphine oxide is isopropyl methylphosphonofluoridate. An example pyridine is pyridine-N-oxide. An example alkali soap includes lithium salicylate. Example quaternary ammonium salts include those available from Air Products and Chemicals, Inc. under the trade names DABCO TMR, DABCO TMR-2, DABCO TMR-3, DABCO TMR-4, and DABCO TMR-5. The quaternary ammonium salts may also be used with organotin compounds as a co-catalyst. An example strong base is ammonia hydroxide.

As an example, an embodiment of a golf ball of the current invention can be made according to the following process. A golf ball with a thermoplastic polyurethane cover is permeated with a solution of isocyanate. The solution of isocyanate can be a solvent, at least one isocyanate compound and a catalyst. The solvent can be, for example, acetone or methyl ethyl ketone (MEK). The isocyanate compound can be about 0.1 to 40% of the solution, with 4 to 5% preferred. Unless otherwise defined herein, the term about means±10% of the referenced amount. The permeating can be performed by, for example, contacting the golf ball with the isocyanate solution for a contacting time from about 1 to about 10 minutes, with 4 to 5 minutes preferred. The contacting can be performed by, for example, soaking or immersing the golf ball in the solution. The contacting of the ball with the solvent can cause the solvent to swell the thermoplastic polyurethane and permit the isocyanate compound to permeate the cover. The greater the contacting time, the deeper the isocyanate can permeate into the cover. The catalyst can catalyze the reaction between the isocyanate compound and a second isocyanate compound in the solution (in this example, isocyanate is the co-reactant). The reaction can occur via the non-active hydrogens of the isocyanate to form isocyanurate, which is a trimer of isocyanate. To form isocyanurate, the catalyst can be, for example, an alkali soap or quaternary ammonium salt. to speed the reaction from. The solution can optionally be heated to between about 76° F. and about 120° F. during contact with the ball to speed the reaction. The ball is removed from contact with the isocyanate solution and heated to a temperature of about 76° F. to about 180° F., with about 76° F. to about 120° F. preferred, for a time from about 10 minutes to about 5 hours. The heating can take place in an oven. After heating, the ball can be cleaned with an alcohol, such as isopropanol or methanol, and allowed to dry. The ball can then be coated with a waterborne primer and allowed to dry. Such waterborne primer can include, for example, a polyurethane dispersion, such as Witcobond 234 from Chemtura. The ball can then be given a final coat of a polyurethane and allowed to dry. Such polyurethane can include, for example, a two-part polyurethane such as a saturated polyester mixed with a HDI prepolymer.

In one embodiment, a golf ball with a thermoplastic polyurethane cover was soaked in an isocyanate solution of acetone, an isocyanate compound in about 15% of the solution, and 0.05% of lithium salicylate. The ball was soaked in the solution for about 2 minutes. The golf ball was removed from the solution and heated to 180° F. for about 4 hours. The ball was then cleaned with isopropanol and allowed to dry. The ball was then coated with a waterborne primer and allowed to dry. A final coating of a two part polyurethane was applied to the ball and allowed to dry.

In one embodiment, a golf ball with a thermoplastic polyurethane cover was soaked in an isocyanate solution of acetone, an isocyanate compound in about 15% of the solution, and 0.1% of Dabco TMR (a quaternary ammonium salt catalyst). The ball was soaked in the solution for about 2 minutes. The golf ball was removed from the solution and heated to 180° F. for about 4 hours. The ball was then cleaned with isopropanol and allowed to dry. The ball was then coated with a waterborne primer and allowed to dry. A final coating of a two part polyurethane was applied to the ball and allowed to dry.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

The invention claimed is:

1. A golf ball comprising:
   a core, at least one intermediate layer, and a cover;
   wherein the cover comprises a thermoplastic resin;
   wherein the cover further comprises aan outer portion and an inner portion, the outer portion comprises an interpenetrating polymer network of the thermoplastic resin and a reaction product of an isocyanate compound comprising about 2% to about 5% of an isocyanate solution and a co-reactant compound having a non-active hydrogen group, wherein the isocyanate solution contacts the outer portion for a contacting time from about 1 to about 5 minutes, and wherein the isocyanate compound in the isocyanate solution reacts with the non-active hydrogen group of the co-reactant compound in the presence of a catalyst which catalyzes a reaction between the isocyanate compound and the nonactive hydrogen group of the co-reactant compound to form the reaction product, and wherein the reaction product comprises, an aromatic polyisocyanurate.

2. The golf ball of claim 1 wherein the inner portion is substantially devoid of the interpenetrating polymer network.

3. The golf ball of claim 1 wherein the outer portion has a thickness of about 0.1 mm to about 1.0 mm.

4. The golf ball of claim 1 wherein the outer portion has a microindentation hardness that is greater than the microindentation hardness of the inner portion.

5. A golf ball comprising:
   a core, at least one intermediate layer, and a cover;
   the cover comprising a thermoplastic resin;
   the cover further comprising an outer portion and an inner portion;
   the outer portion comprising an interpenetrating polymer network of the thermoplastic resin and a reaction product of an isocyanate compound comprising about 2% to about 5% of an isocvanate solution and a co-reactant compound having anon-active hydrogen group, wherein the isocyanate solution contacts the outer portion for a contacting time from about 1 to about 5 minutes, and wherein the isocyanate compound reacts with the non-active hydrogen group of the co-reactant compound in the presence of a catalyst which catalyzes a reaction between the isocyanate compound and the non-active hydrogen group of the co-reactant compound to form the reaction product, the reaction product comprising an aromatic polyisocyamurate.

6. The golf ball of claim 5 wherein the catalyst is at least one of a phosphine oxide, a pyridine, an alkali soap, a quaternary ammonium salt, a strong base, an organoantimony iodide, a zinc acetyl-acetonate, and a benzoyl chloride.

7. The golf ball of claim 5 wherein the co-reactant compound is a second isocyanate compound and the catalyst is one of an alkali soap and a quaternary ammonium salt.

8. A method of manufacturing a golf ball comprising:
   molding a cover comprised of a thermoplastic resin over at least one intermediate layer of
   a golf ball; and
   permeating an isocyanate solution comprising an isocyanate compound, a co-reactant compound having anon-active hydrogen group, and a catalyst into an outer portion of the cover; wherein the isocyanate compound comprises about 2% to about 5% of isocyanate solution and wherein permeating the isocyanate solution into the outer portion of the cover comprises contacting the golf ball with the isocyanate solution for contacting time from about 1 to about 5 minutes;
   wherein the catalyst catalyzes a reaction between the isocyanate compound and the non-active hydrogen group of the co-reactant compound to form a reaction product, wherein the reaction product comprises an interpenetrating polymer network of the thermoplastic resin and an aromatic polyisocyanurate, wherein the reaction product modifies at least one physical property of the outer portion such that the physical property of the outer portion is different than the physical property of the inner portion.

9. The method of claim 8 wherein the catalyst is at least one of a phosphine oxide, a pyridine, an alkali soap, a quaternary ammonium salt, a strong base, an organoantimony iodide, a zinc acetyl-acetonate, and a benzoyl chloride.

10. The method of claim 8 wherein the at least one physical property is microindentation hardness and wherein the microindentation hardness of the outer portion is greater than the microindentation hardness of the inner portion.

11. The method of claim 8 wherein the step of contacting the golf ball with the isocyanate solution is performed with the isocyanate solution at a temperature of about 76° F. to about 120° F.;
   the method further comprising:
   removing the golf ball from contact with the isocyanate solution;
   heating the golf ball to a temperature from about 76° F. to about 180° F. for a time from about 10 minutes to about 5 hours;
   cleaning the golf ball with an alcohol solution;
   covering the golf ball with a waterborne primer; and
   coating the golf ball with a polyurethane.

12. A golf ball made according to the method of claim 8

13. A golf ball made according to the method of claim 8 wherein the co-reactant compound is a second isocyanate compound, the catalyst is one of an alkali soap and a quaternary ammonium salt.

* * * * *